(12) United States Patent
Anand et al.

(10) Patent No.: US 8,122,167 B1
(45) Date of Patent: Feb. 21, 2012

(54) POLLING IN A VIRTUALIZED INFORMATION HANDLING SYSTEM

(75) Inventors: Vaijayanthimala K. Anand, Austin, TX (US); Ronen Grosman, Thornhill, CA (US); Michael E. Lyons, Round Rock, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/851,634

(22) Filed: Aug. 6, 2010

(51) Int. Cl.
*G06F 13/24* (2006.01)
*G06F 3/00* (2006.01)

(52) U.S. Cl. .......................... 710/47; 710/260; 719/318

(58) Field of Classification Search .............. 710/46–48, 710/260–266; 719/318, 328; 718/100
See application file for complete search history.

(56) References Cited

U.S. PATENT DOCUMENTS

| | | | |
|---|---|---|---|
| 5,905,889 A * | 5/1999 | Wilhelm, Jr. ................. | 718/104 |
| 7,613,897 B2 | 11/2009 | Armstrong et al. | |
| 7,752,370 B2 * | 7/2010 | Ma ............................... | 710/263 |
| 2002/0103847 A1 * | 8/2002 | Potash ......................... | 709/107 |
| 2003/0065833 A1 * | 4/2003 | Brice et al. .................. | 710/50 |
| 2003/0101293 A1 * | 5/2003 | Stevens ........................ | 709/330 |
| 2005/0071814 A1 * | 3/2005 | Aguilar et al. ............... | 717/127 |
| 2006/0107263 A1 | 5/2006 | Benhase et al. | |
| 2006/0155552 A1 * | 7/2006 | Chen et al. ................... | 705/1 |
| 2008/0104296 A1 * | 5/2008 | Blackmore et al. .......... | 710/267 |
| 2008/0148291 A1 * | 6/2008 | Huang et al. ................. | 719/320 |
| 2008/0184257 A1 | 7/2008 | Olszewski et al. | |
| 2009/0037941 A1 | 2/2009 | Armstrong et al. | |
| 2009/0204959 A1 | 8/2009 | Anand et al. | |
| 2009/0235270 A1 | 9/2009 | Anand et al. | |
| 2009/0300317 A1 | 12/2009 | Hepkin et al. | |
| 2009/0307690 A1 | 12/2009 | Logan et al. | |
| 2009/0307711 A1 | 12/2009 | Krishnamurthy et al. | |
| 2010/0083252 A1 | 4/2010 | Eide et al. | |
| 2011/0173625 A1 * | 7/2011 | Arimilli et al. .............. | 718/103 |

OTHER PUBLICATIONS

H. Umeno et al., "New Method for Dispatching Waiting Logical Processors in Virtual Machine System," Proceedings of the 29th Annual International Computer Software and Applications Conference, 2005.
D. Kim et al., "Design of the Operating System Virtualization on L4 Microkernel," Fourth International Conference on Networked Computing and Advanced Information Management, 2008, pp. 307-310.
C. Hong et al., "Hypervisor Design Considering Network Performance for Multi-core CE Devices," IEEE, 2010.

* cited by examiner

*Primary Examiner* — Christopher B Shin
(74) *Attorney, Agent, or Firm* — Diana R. Gerhardt; Michael Davis

(57) ABSTRACT

A software thread is dispatched for causing the system to poll a device for determining whether a condition has occurred. Subsequently, the software thread is undispatched and, in response thereto, an interrupt is enabled on the device, so that the device is enabled to generate the interrupt in response to an occurrence of the condition, and so that the system ceases polling the device for determining whether the condition has occurred. Eventually, the software thread is redispatched and, in response thereto, the interrupt is disabled on the device, so that the system resumes polling the device for determining whether the condition has occurred.

20 Claims, 3 Drawing Sheets

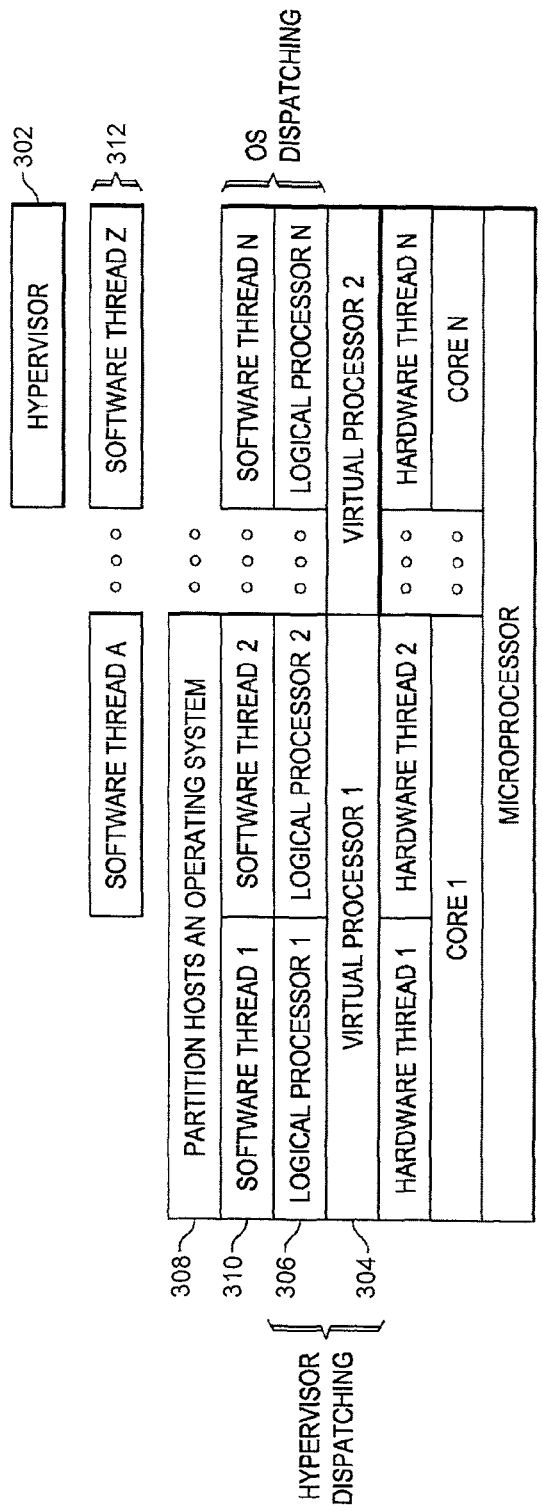

POLLING IN A VIRTUALIZED INFORMATION HANDLING SYSTEM

BACKGROUND

The disclosures herein relate in general to information handling systems, and in particular to polling in a virtualized information handling system.

A virtualized information handling system can dispatch a partition under a software hypervisor time-slicing window technique. A user direct access programming library ("uDAPL") defines a set of application programming interfaces ("APIs") for remote direct memory access ("RDMA") transfers of information in the system. A uDAPL-based operation may have a latency of a few microseconds, while a software hypervisor may have a time-slicing window of a few milliseconds. In that manner, uDAPL-based operations raise a potential challenge for the software hypervisor virtualization.

BRIEF SUMMARY

A software thread is dispatched for causing the system to poll a device for determining whether a condition has occurred. Subsequently, the software thread is undispatched and, in response thereto, an interrupt is enabled on the device, so that the device is enabled to generate the interrupt in response to an occurrence of the condition, and so that the system ceases polling the device for determining whether the condition has occurred. Eventually, the software thread is redispatched and, in response thereto, the interrupt is disabled on the device, so that the system resumes polling the device for determining whether the condition has occurred.

BRIEF DESCRIPTION OF THE SEVERAL VIEWS OF THE DRAWINGS

FIG. 2 is a diagram of a first example logical configuration of virtualization assignments in a representative operation of the information handling system of FIG. 1.

FIG. 3 is a diagram of a second example logical configuration of virtualization assignments, corresponding to the first example of FIG. 2.

DETAILED DESCRIPTION

Figure 1:
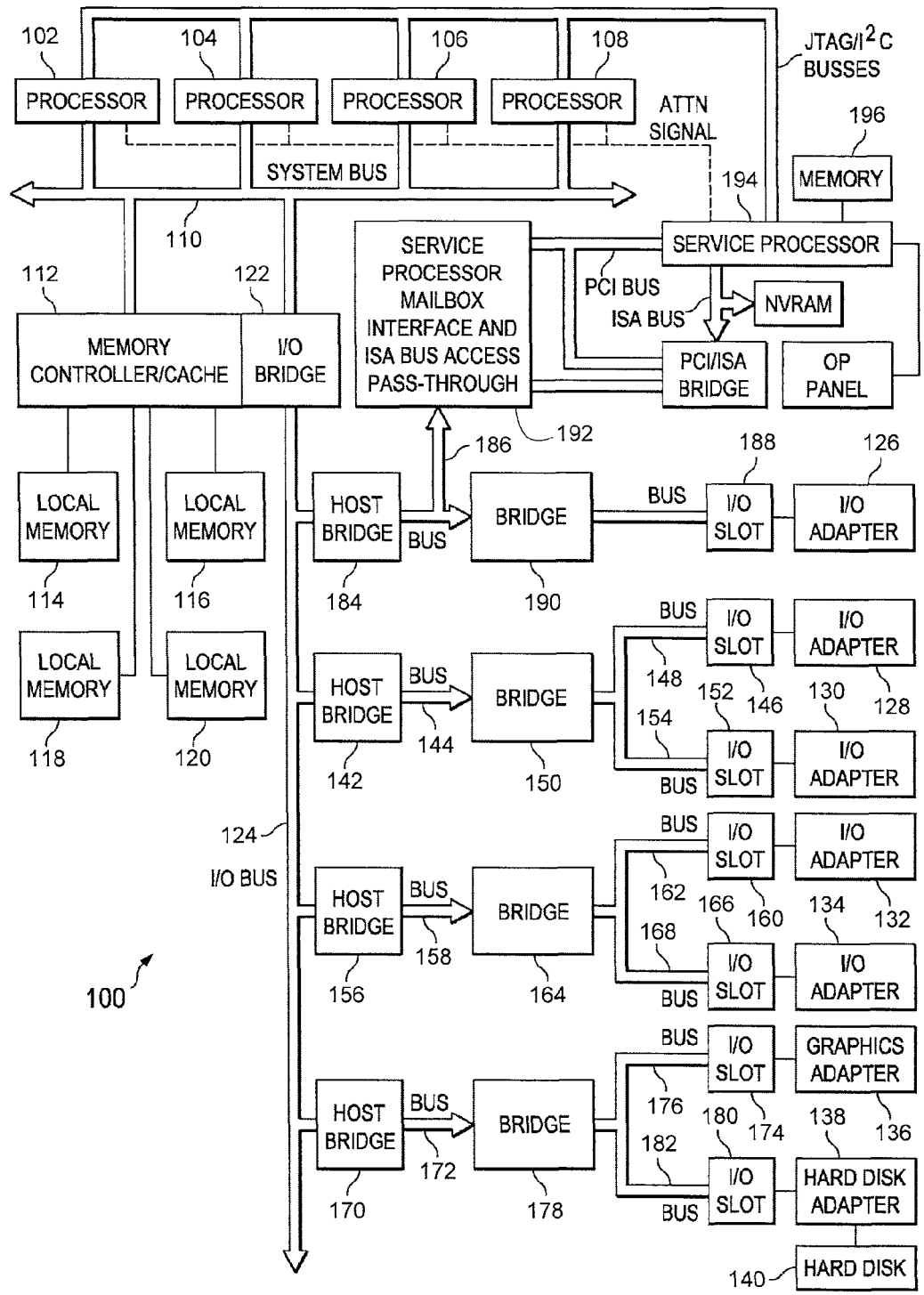
FIG. 1 is a block diagram of an information handling system of the illustrative embodiment.

FIG. 1 is a block diagram of an information handling system, indicated generally at 100, of the illustrative embodiment. In the example of FIG. 1, the system 100 is a symmetric multiprocessor ("SMP") system. In an alternative embodiment, the system 100 is a single processor system.

As shown in FIG. 1, the system 100 includes multiple processors 102, 104, 106 and 108, which are coupled to a system bus 110 for communicating information between such processors. Also, the system bus 110 is coupled to: (a) a memory controller/cache 112 for communicating information between the system bus 110 and local memories 114, 116, 118 and 120; and (b) an input/output ("I/O") bridge 122 for communicating information between the system bus 110 and an I/O bus 124. In the example of FIG. 1, the memory controller/cache 112 and the I/O bridge 122 are integral with one another.

The system 100 is a logically partitioned ("LPAR") information handling system for simultaneously executing: (a) multiple heterogeneous operating systems; (b) multiple instances of a single operating system; and/or (c) one or more software programs within any such operating system. The system 100 assigns such operating systems to respective logical partitions, so that an operating system accesses devices that are likewise assigned (by the system 100) to such operating system's respective logical partition. In one example, the system 100 executes a first instance of a first operating system within a first logical partition, a second instance (or image) of the first operating system within a second logical partition, and a second operating system within a third logical partition.

Accordingly, the system 100 assigns various devices to the logical partitions. Such devices include I/O adapters 126, 128, 130, 132 and 134, a memory mapped graphics adapter 136 (e.g., for communicating with a display device), and a hard disk adapter 138 for communicating with a hard disk 140. In the illustrative embodiment, the local memories 114, 116, 118 and 120 are dual in-line memory modules ("DIMMs"), and the system 100 assigns different portions of their total memory to respective logical partitions. In one example: (a) the processors 104 and 106, the I/O adapters 126 and 130, and a first portion of the total memory of the local memories 114, 116, 118 and 120, are assigned to the first logical partition by the system 100; and (b) the processor 108, the graphics adapter 136, the hard disk adapter 138, and a second portion of the total memory of the local memories 114, 116, 118 and 120, are assigned to the second logical partition by the system 100.

A host bridge 142 is connected to the I/O bus 124 for communicating information between the I/O bus 124 and a local bus 144. As shown in FIG. 1: (a) for communicating information between the I/O adapter 128 and the local bus 144, the I/O adapter 128 is coupled to the local bus 144 through an I/O slot 146, a bus 148, and a bridge 150; and (b) for communicating information between the I/O adapter 130 and the local bus 144, the I/O adapter 130 is coupled to the local bus 144 through an I/O slot 152, a bus 154, and the bridge 150. Also, the bridge 150 communicates information between the bus 148 and the bus 154. The I/O adapters 128 and 130 are installed within the I/O slots 146 and 152, respectively. The I/O adapters 128 and 130 communicate information between the system 100 and other devices, such as other network computers (e.g., clients of the system 100).

A host bridge 156 is connected to the I/O bus 124 for communicating information between the I/O bus 124 and a local bus 158. As shown in FIG. 1: (a) for communicating information between the I/O adapter 132 and the local bus 158, the I/O adapter 132 is coupled to the local bus 158 through an I/O slot 160, a bus 162, and a bridge 164; and (b) for communicating information between the I/O adapter 134 and the local bus 158, the I/O adapter 134 is coupled to the local bus 158 through an I/O slot 166, a bus 168, and the bridge 164. Also, the bridge 164 communicates information between the bus 162 and the bus 168. The I/O adapters 132 and 134 are installed within the I/O slots 160 and 166, respectively. The I/O adapters 132 and 134 communicate information between the system 100 and other devices, such as modems or network adapters.

A host bridge 170 is connected to the I/O bus 124 for communicating information between the I/O bus 124 and a local bus 172. As shown in FIG. 1: (a) for communicating information between the graphics adapter 136 and the local bus 172, the graphics adapter 136 is coupled to the local bus 172 through an I/O slot 174, a bus 176, and a bridge 178; and (b) for communicating information between the hard disk adapter 138 and the local bus 172, the hard disk adapter 138 is coupled to the local bus 172 through an I/O slot 180, a bus 182, and the bridge 178. Also, the bridge 178 communicates information between the bus 176 and the bus 182. The graphics adapter 136 and the hard disk adapter 138 are installed within the I/O slots 174 and 180, respectively.

A host bridge 184 is connected to the I/O bus 124 for communicating information between the I/O bus 124 and a local bus 186. As shown in FIG. 1, for communicating information between the I/O adapter 126 and the local bus 186, the I/O adapter 126 is coupled to the local bus 186 through an I/O slot 188, another bus, and a bridge 190. The I/O adapter 126 is installed within the I/O slot 188.

Through the local bus 186, the host bridge 184 is further connected to service processor mailbox interface and ISA (industry standard architecture) bus access pass-through logic 192. Such logic 192 forwards communications between the local bus 186 and a PCI/ISA bridge. As shown in FIG. 1: (a) the PCI/ISA bridge is coupled through an ISA bus to a service processor 194 and a non-volatile random access memory ("NVRAM"); (b) through a local PCI bus, the service processor 194 is directly connected to the logic 192 and the PCI/ISA bridge; (c) through multiple JTAG/I²C busses, the service processor 194 is directly connected to the processors 102, 104, 106 and 108; (d) multiple ATTN lines of the processors 102, 104, 106 and 108 are connected to an interrupt input line of the service processor 194; and (e) the service processor 194 is connected to its own local memory 196 and a user interface ("OP") panel. The JTAG/I²C busses include JTAG/scan busses (as defined by Institute for Electrical and Electronics Engineers standard 1149.1) and/or Philips I²C busses.

In response to the system 100 being initially powered, the service processor 194: (a) inventories the system 100 topology by interrogating the processors 102, 104, 106 and 108, the memory controller/cache 112, and the I/O bridge 122, through the JTAG/I²C busses; (b) executes built-in-self-tests ("BISTs"), basic assurance tests ("BATs"), and memory tests on various elements of such topology; and (c) through the OP panel, reports errors (if any) from such tests.

After sufficient completion of such tests, the system 100 loads executable software code into the local memories 114, 116, 118 and 120. In response to signals from the service processor 194, the processors 102, 104, 106 and 108 execute such code. The service processor 194 monitors such execution and reports errors (if any) from such execution. For example, the service processor 194 monitors cooling fan speed and operation, thermal sensors, power supply regulators, and recoverable and non-recoverable errors (if any) that are reported by the processors 102, 104, 106 and 108, the local memories 114, 116, 118 and 120, and/or the I/O bridge 122. The service processor 194: (a) saves and reports (through the OP panel) such errors and other information about such monitoring; and (b) performs other suitable operations in response to such errors and other information.

FIG. 2 is a diagram of a first example logical configuration of virtualization assignments in a representative operation of the system 100. The system 100 stores such information (of FIG. 2) in its memory. The assignments are shown as tiers 202, 204, 206, 208, 210 and 212.

The tier 212 shows a microprocessor that supports multiple cores in the tier 210, including one or more of the processors 102, 104, 106 and 108. In the example of FIG. 2, the tier 210 shows a core 1 and a core 2. As shown in FIG. 2, the core 1 supports a hardware thread 1 and a hardware thread 2 in the tier 208, and such threads support a virtual processor 1 in the tier 206.

The core 2 supports a hardware thread 3 and a hardware thread 4 in the tier 208, and such threads support a virtual processor 2 in the tier 206. The virtual processor 1 supports a logical processor 1 and a logical processor 2 in the tier 204, which in turn support a software thread 1 and a software thread 2 in the tier 202. The virtual processor 2 supports a logical processor 3 and a logical processor 4 in the tier 204, which in turn support a software thread 3 and a software thread 4 in the tier 202.

FIG. 3 is a diagram of a second example logical configuration of virtualization assignments, corresponding to the first example of FIG. 2. The system 100 stores such information (of FIG. 3) in its memory. In response to instructions of a software hypervisor 302, the system 100 dispatches (at a tier 304) the virtual processor 1 to the core 1, resulting in activation (at a tier 306) of the logical processor 1 and the logical processor 2.

A partition-hosted operating system (at a tier 308) causes the hardware threads of such virtual processors to dispatch one or more software threads (at a tier 310) to such logical processors. For example, the partition-hosted operating system (at the tier 308) causes: (a) the hardware thread 1 to dispatch the software thread 1 (at the tier 310) to the logical processor 1; and (b) the hardware thread 2 to dispatch the software thread 2 (at the tier 310) to the logical processor 2. If a virtual processor becomes preempted or blocked, then the software hypervisor 302 causes the system 100 to create and manage a ready-to-run queue 312 of blocked and ready to run virtual processors, which the software hypervisor 302 causes the system 100 to select for dispatch to a suitable processor (e.g., one or more of the processors 102, 104, 106 and 108) in response to elimination of such preemption or blockage condition.

In response to instructions of the software hypervisor 302, the system 100 dispatches (at the tier 304) additional virtual processors (e.g., the virtual processor 2) to additional cores (e.g., the core 2), resulting in activation (at the tier 306) of additional logical processors. The partition-hosted operating system (at the tier 308) causes the hardware threads of such additional virtual processors to dispatch additional software threads (at the tier 310) to such additional logical processors.

Accordingly, the software hypervisor 302 causes allocation of the system 100 hardware resources to various active partitions. The software hypervisor 302 implements a time-slicing window technique. With such a technique, in successive time-slicing windows, the software hypervisor 302 causes a suitable cycle of dispatching and undispatching for effectively allocating the system 100 hardware resources to be shared among several virtual processors in a time division multiplexed manner.

For example, at the start of a first time-slicing window, the software hypervisor 302 causes dispatching of a first one or more virtual processors by allocating one or more of such hardware resources to the first one or more virtual processors. At the start of a second time-slicing window (upon expiration of the first time-slicing window), the software hypervisor 302 causes undispatching of the first one or more virtual processors and dispatching of a second one or more virtual processors by reallocating such hardware resources to the second one or more virtual processors. Similarly, at the start of a third time-slicing window (upon expiration of the second time-slicing window), the software hypervisor 302 causes undispatching of the second one or more virtual processors and dispatching of either: (a) the first one or more virtual processors by reallocating such hardware resources to the first one or more virtual processors; or (b) an additional one or more virtual processors, if any, by reallocating such hardware resources to the additional one or more virtual processors.

In one example of a partition's operation: (a) the I/O adapter 128 communicates information between the system 100 and InfiniBand network devices; and (b) one or more software threads of the partition cause their supporting hardware threads to actively (e.g., on a substantially continuous basis) poll the I/O adapter 128 (e.g., memory associated with the I/O adapter 128) for determining whether the I/O adapter 128 has (i) completed an event ("event completion") and/or (ii) requested a service from the system 100 ("service request"). Such polling reduces latency, because it reduces overhead that would otherwise be incurred from handling an interrupt (e.g., an interrupt generated by the I/O adapter 128 in response to such event completion and/or service request). In response to such event completion and/or service request, the system 100 communicates information to and/or from the I/O adapter 128.

The system 100 is operable to conduct such polling in various ways, such as busy wait in user space, yield semantics, or event short sleeps. Accordingly, even if a virtual processor is idle, one or more of its software threads may have been in the process of causing such polling. To indicate that the software thread is in the process of causing such polling, the system 100 sets an associated polling flag (which the system 100 stores in its memory), so that the software thread's associated polling flag has a logical 1 "true" state. Conversely, to indicate that the software thread is not in the process of causing such polling, the system 100 clears the software thread's associated polling flag, so that the software thread's associated polling flag has a logical 0 "false" state.

InfiniBand is one example of a remote direct memory access ("RDMA") implementation. In the system 100, a user direct access programming library ("uDAPL") defines a set of application programming interfaces ("APIs") for RDMA transfers of information. A uDAPL-based operation may have a latency of a few microseconds, while the software hypervisor 302 may have a time-slicing window of a few milliseconds. In response to a suitable interrupt, the software hypervisor 302 causes dispatching of a partition (and dispatching of virtual processors that support such partition) sooner than otherwise scheduled under the software hypervisor 302 time-slicing window technique. In that manner, uDAPL-based operations raise a potential challenge for the software hypervisor 302 virtualization.

Figure 4:
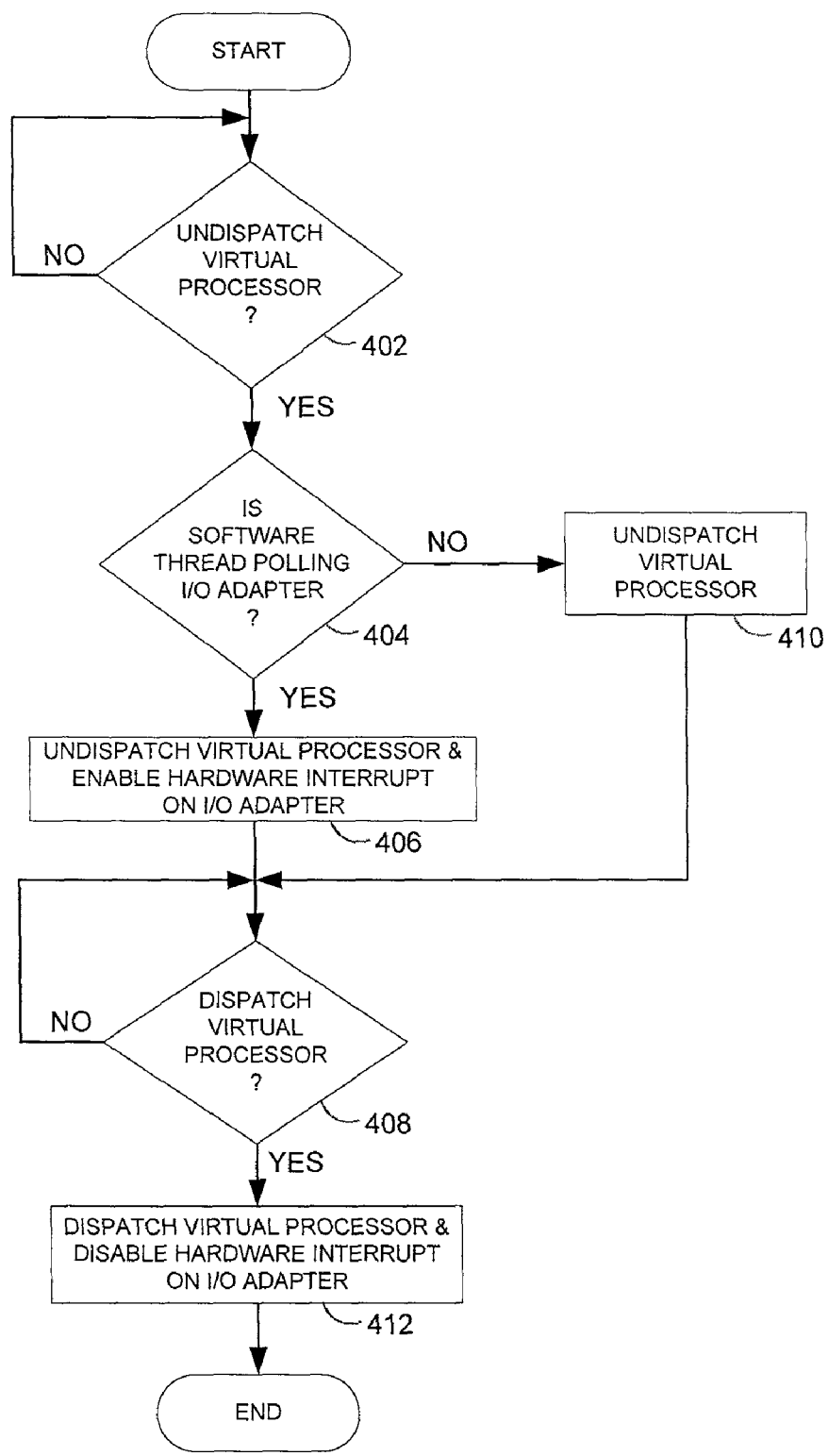
FIG. 4 is a flowchart of an operation of the information handling system of FIG. 1.

FIG. 4 is a flowchart of an operation of the system 100, in a situation where: (a) the I/O adapter 128 communicates information between the system 100 and InfiniBand network devices; and (b) one or more software threads of the partition may cause their supporting hardware threads to actively poll the I/O adapter 128 (e.g., memory associated with the I/O adapter 128) for determining whether such event completion and/or service request has occurred ("polling thread"). At a step 402, the operation self-loops until a particular virtual processor (e.g., the virtual processor 1 in FIG. 3) is scheduled to be undispatched under the software hypervisor 302 time-slicing window technique. At a next step 404, the software hypervisor 302 causes the system 100 to read associated polling flags of the particular virtual processor's software threads to determine whether the particular virtual processor is executing one or more polling threads.

If the particular virtual processor is executing a polling thread, then the operation continues from the step 404 to a step 406, at which the software hypervisor 302 causes undispatching of the particular virtual processor and enabling of a hardware interrupt on the I/O adapter 128 (which is being actively polled by the polling thread in this example), so that the system 100 ceases such polling. After the step 406, the operation continues to a step 408. Conversely, if the particular virtual processor is not executing a polling thread, then the operation continues from the step 404 to a step 410, at which the software hypervisor 302 causes undispatching of the particular virtual processor. After the step 410, the operation continues to the step 408.

At the step 408, the operation self-loops until a suitable moment for redispatching the particular virtual processor. In response to the suitable moment for redispatching the particular virtual processor, the operation continues from the step 408 to a step 412, at which the software hypervisor 302 causes redispatching of the particular virtual processor and disabling of the aforementioned hardware interrupt (if previously enabled at the step 406) on the I/O adapter 128, so that the system 100 resumes such polling (if previously ceased at the step 406). After the step 412, the operation ends.

After the step 406, yet before the step 412, the I/O adapter 128 generates the hardware interrupt in response to such event completion and/or service request. In response to such generated hardware interrupt, the software hypervisor 302 causes the system 100 to increase a priority of redispatching the particular virtual processor, so that the particular virtual processor may be redispatched at the step 412 sooner than otherwise scheduled under the software hypervisor 302 time-slicing window technique. After the particular virtual processor is so redispatched at the step 412, the system 100 executes the particular virtual processor's software threads for communicating information to and/or from the I/O adapter 128 in response to such event completion and/or service request, so that such event completion and/or service request is suitably handled in a more timely manner. In the illustrative embodiment, the software thread operations are programmable without reference to the software hypervisor 302 operations.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including, but not limited to, firmware, resident software, or microcode) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be used in the illustrative embodiment. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium (including, but not limited to, wireless, wireline, optical fiber cable, RF, or any suitable combination of the foregoing).

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer, and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described with reference to flowchart illustrations and/or block diagrams of methods, apparatus (systems) and computer program products according to the illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions (which execute via the processor of the computer or other programmable data processing apparatus) are processable to cause performance of the functions/acts specified in the flowchart and/or block diagram block or blocks.

These computer program instructions may also be stored in a computer readable medium that can direct a computer, other programmable data processing apparatus, or other devices to operate in a particular manner, such that the instructions stored in the computer readable medium produce an article of manufacture, including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions that execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to the illustrative embodiments. In this regard, each block in the flowchart or block diagrams may represent a module, segment, or portion of code, which includes one or more executable instructions for implementing the specified logical operation(s). In some alternative implementations, the operations noted in the block may occur out of the order noted in the Figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified operations or acts, or combinations of special purpose hardware and computer instructions.

The terminology used herein is for the purpose of describing particular embodiments only and is not intended to be limiting of the inventions. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the inventions in the form disclosed. Many modifications and variations will be apparent to those of ordinary skill in the art without departing from the scope and spirit of the inventions. The embodiment was chosen and described in order to best explain the principles of the inventions and the practical application, and to enable others of ordinary skill in the art to understand the inventions for various embodiments with various modifications as are suited to the particular use contemplated.

What is claimed is:

1. A method performed by an information handling system, the method comprising:
    dispatching a software thread for causing the information handling system to poll a device for determining whether a condition has occurred;
    undispatching the software thread and, in response thereto, enabling an interrupt on the device, so that the device is enabled to generate the interrupt in response to an occurrence of the condition, and so that the information handling system ceases polling the device for determining whether the condition has occurred; and
    redispatching the software thread and, in response thereto, disabling the interrupt on the device, so that the information handling system resumes polling the device for determining whether the condition has occurred.

2. The method of claim 1, wherein redispatching the software thread comprises:
    redispatching the software thread in response to the device generating the interrupt.

3. The method of claim 1, wherein redispatching the software thread comprises:
   redispatching the software thread in response to expiration of a time-slicing window.

4. The method of claim 1, wherein the condition is the device's completion of an event.

5. The method of claim 1, wherein the condition is the device's request of a service.

6. The method of claim 1, and comprising:
   communicating with the device in response to the occurrence of the condition.

7. The method of claim 1, wherein dispatching the software thread comprises:
   dispatching a virtual processor in the information handling system and, in response thereto, dispatching the software thread.

8. The method of claim 7, wherein undispatching the software thread comprises:
   undispatching the virtual processor in the information handling system and, in response thereto, undispatching the software thread.

9. The method of claim 7, wherein dispatching the virtual processor comprises:
   dispatching a partition in the information handling system and, in response thereto, dispatching the virtual processor.

10. The method of claim 1, and comprising:
    storing a flag to indicate that the software thread instructs the information handling system to poll the device.

11. A system, comprising:
    a device; and
    a processor for: dispatching a software thread for causing the system to poll the device for determining whether a condition has occurred; undispatching the software thread and, in response thereto, enabling an interrupt on the device, so that the device is enabled to generate the interrupt in response to an occurrence of the condition, and so that the system ceases polling the device for determining whether the condition has occurred; and redispatching the software thread and, in response thereto, disabling the interrupt on the device, so that the system resumes polling the device for determining whether the condition has occurred.

12. The system of claim 11, wherein the processor is for redispatching the software thread in response to the device generating the interrupt.

13. The system of claim 11, wherein the processor is for redispatching the software thread in response to expiration of a time-slicing window.

14. The system of claim 11, wherein the condition is the device's completion of an event.

15. The system of claim 11, wherein the condition is the device's request of a service.

16. The system of claim 11, wherein the software thread instructs the system to communicate with the device in response to the occurrence of the condition.

17. The system of claim 11, wherein the processor is for dispatching a virtual processor in the system and, in response thereto, dispatching the software thread.

18. The system of claim 17, wherein the processor is for undispatching the virtual processor in the system and, in response thereto, undispatching the software thread.

19. The system of claim 17, wherein the processor is for dispatching a partition in the system and, in response thereto, dispatching the virtual processor.

20. The system of claim 11, wherein the processor is for storing a flag to indicate that the software thread instructs the system to poll the device.

* * * * *